US006080834A

United States Patent [19]

Putzig et al.

[11] Patent Number: 6,080,834

[45] Date of Patent: Jun. 27, 2000

[54] TITANIUM-CONTAINING CATALYST COMPOSITION AND PROCESSES THEREFOR AND THEREWITH

[75] Inventors: Donald Edward Putzig, Newark; Edward Francis McBride, Wilmington; Hiep Quang Do, Newark, all of Del.; James Arthur Trainham, Wilmington, N.C.; Hermann Ludwig Jaeger, Hamm; Heiner Schulte, Munster, both of Germany

[73] Assignee: E. I. du Pont de Nemours and Company, Wilmington, Del.

[21] Appl. No.: 09/293,302

[22] Filed: Apr. 16, 1999

[51] Int. Cl.[7] ............................ C08G 63/78; B01J 31/00

[52] U.S. Cl. .......................... 528/279; 528/271; 528/274; 528/275; 528/280; 528/282; 528/285; 528/286; 528/298; 528/300; 528/301; 528/302; 528/306; 528/307; 528/308; 528/308.6; 524/701; 524/706; 524/709; 524/714; 524/745; 524/755; 524/766; 524/783; 524/786; 502/103; 502/104; 502/121; 502/122; 502/123; 502/126; 502/132; 502/168; 502/172

[58] Field of Search .................................... 528/274, 271, 528/275, 279, 280, 282, 285, 286, 298, 300, 301, 302, 306, 307, 308, 308.6; 524/701, 706, 709, 714, 745, 755, 766, 783, 786; 502/103, 104, 121, 122, 123, 126, 132, 168, 172

[56] References Cited

U.S. PATENT DOCUMENTS 5,922,828 7/1999 Schiraldi ................................ 528/279

*Primary Examiner*—Samuel A. Acquah

[57] ABSTRACT

A catalyst composition is disclosed. The composition comprises a titanium compound, a complexing agent, a solvent, and optionally a cocatalyst. The cocatalyst can be a cobalt/aluminum catalyst, an antimony compound, or combinations thereof. Also disclosed is a process for producing the composition. The process comprises combining a titanium compound, a complexing agent, a solvent, and optionally a cocatalyst. Further disclosed is a process for using the composition which comprises contacting a carbonyl compound, in the presence of the composition, with an alcohol under a condition suitable for esterification, transesterification, polymerization, or combinations thereof.

57 Claims, No Drawings

TITANIUM-CONTAINING CATALYST COMPOSITION AND PROCESSES THEREFOR AND THEREWITH

FIELD OF INVENTION

This invention relates to a catalyst composition comprising a titanium compound, to a process for producing the composition, and to a process for using the composition in, for example, esterification, transesterification, or polymerization of a carbonyl compound.

BACKGROUND OF THE INVENTION

Polyesters such as, for example, polyethylene terephthalate (PET) and polybutylene terephthalate (PBT), generally referred to as "polyalkylene terephthalates", are a class of important industrial polymers. They are widely used in thermoplastic fibers, films, and molding applications.

Polyalkylene terephthalates can be produced by transesterification of a dialkyl terephthalate ester with a glycol or by direct esterification of terephthalic acid with the selected glycol followed by polycondensation. A catalyst is used to catalyze the esterification, transesterification or polycondensation.

Many commercial processes use manganese or zinc salts as the catalyst for the transesterification step. Antimony, in the form of a glycol solution of antimony oxide, typically is used as the polycondensation catalyst in either the transesterification or direct esterification process outlined above. However, antimony forms insoluble antimony complexes that plugs fiber spinnerets. Furthermore, the use of antimony catalysts is generally less environmentally friendly, especially in food contact applications.

Organic titanates, such as tetraisopropyl and tetra n-butyl titanates, are known to be effective polycondensation catalysts for preparing polyalkylene terephthalates in general, and frequently are the catalyst of choice. However, organic titanates are not generally used in producing PET because residual titanate tends to react with trace impurities, such as aldehydes, formed during the polycondensation and processing of PET thereby generating undesirable yellow discoloration. Additionally, many organic titanate catalysts are also substantially insoluble in a polymerization mixture thereby creating non-uniform distribution of catalyst in the mixture.

Therefore, there is an increasing need for the development of a new catalyst that is substantially soluble, efficient, and produces a polymer with reduced color.

An advantage of the present invention catalyst composition is that, when used in producing a particular polyalkylene terephthalate, it has a high reactivity and the polymer produced therefrom has improved optical properties (e.g., less undesirable color) compared to polymer produced using previously known organic titanate catalysts. Other advantages will become more apparent as the invention is more fully disclosed hereinbelow.

SUMMARY OF THE INVENTION

According to a first embodiment of the present invention, a catalyst composition, which can be used as an esterification or transesterification catalyst, or as a polycondensation catalyst to produce polyalkylene terephthalates, is provided. The composition comprises an organic titanium compound, a complexing agent, and optionally water, a cocatalyst, or both.

According to a second embodiment of the present invention a process for the production of a catalyst composition is provided. The process comprises combining a solvent, an organic titanium compound, a complexing agent, and optionally water, a cocatalyst, or both.

According to a third embodiment of the present invention, a process which can be used in, for example, the production of an ester or polyester is provided. The process comprises contacting, in the presence of a catalyst composition, a carbonyl compound with an alcohol. The catalyst composition is the same as the composition disclosed above.

DETAILED DESCRIPTION OF THE INVENTION

According to the first embodiment of the present invention, a catalyst composition is provided. The composition can comprise an organic titanium compound, a complexing agent, a phosphorus source, and optionally a sulfonic acid, a cocatalyst, or both. The composition can consist essentially or consist of an organic titanium compound, a complexing agent, and a phosphorus source. The composition can also consist essentially or consist of an organic titanium compound, a complexing agent, a sulfonic acid, and a phosphorus source. The composition can also consist essentially or consist of an organic titanium compound, a complexing agent, a phosphorus source, a sulfonic acid, and a cocatalyst. The cocatalyst can be selected from the group consisting of a cobalt/aluminum catalyst as described in U.S. Pat. No. 5,674,801, an antimony compound, and combinations thereof.

The catalyst composition of this invention is substantially soluble in a solvent. The term "substantially" means more than trivial. It is preferred that the composition be completely soluble in the solvent. However, a substantial portion of the composition can also be suspended or dispersed in the solvent.

According to the present invention, the presently preferred titanium compounds are organic titanium compounds. Titanium tetrahydrocarbyloxides are presently the most preferred organic titanium compounds because they are readily available and effective. Examples of suitable titanium tetrahydrocarbyloxide compounds include those expressed by the general formula $Ti(OR)_4$ where each R is independently selected from the group consisting of an alkyl radical, a cycloalkyl radical, an aralkyl hydrocarbon radical, and combinations of two or more thereof. Each radical can contain from 1 to about 30, preferably 2 to about 18, and most preferably 2 to 12 carbon atoms per radical and each R can be the same or different. Titanium tetrahydrocarbyloxides in which the hydrocarbyl group contains from 2 to about 12 carbon atoms per radical which is a linear or branched alkyl radical are most preferred because they are relatively inexpensive, more readily available, and effective in forming the solution. Suitable titanium tetrahydrocarbyloxides include, but are not limited to, titanium tetraethoxide, titanium propoxide, titanium isopropoxide, titanium tetra-n-butoxide, titanium tetrahexoxide, titanium tetra 2-ethylhexoxide, titanium tetraoctoxide, and combinations of any two or more thereof.

The presence of a halide, or of other active substituent, in the R group generally is avoided since such substituents can interfere with catalytic reactions or form undesired by-products, which can contaminate the polymer when the titanium compound is used for producing a polymer. Presently it is also preferred that the each R group is identical to facilitate synthesis of the organic titanate. In some cases two or more R groups can be from a common compound chemically bonded together other than at the titanium atom (i.e., multidentate ligands such as triethanolamine, citric acid, lactic acid, malic acid, tartaric acid, hydroxyglycine, a salt of the acid, and combinations of two or more thereof).

The titanium tetrahydrocarbyloxides suitable for use in the present invention can also be produced by, for example, mixing titanium tetrachloride and an alcohol in the presence of a base, such as ammonia, to form the tetraalkyl titanate. The alcohol typically is ethanol, n-propanol, isopropanol, n-butanol, or isobutanol. Methanol generally is not employed because the resulting tetramethyl titanate is insoluble in the reaction mixture, complicating its isolation. Tetraalkyl titanates thus produced can be recovered by first removing by-product ammonium chloride by any means known to one skilled in the art such as filtration followed by distilling the tetraalkyl titanate from the reaction mixture. This process can be carried out at a temperature in the range of from about 0 to about 150° C. Titanates having longer alkyl groups can also be produced by transesterification of those having R groups up to $C_4$ with alcohols having more than 4 carbon atoms per molecule.

Examples of commercially available organic titanium compounds include, but are not limited to, TYZOR® TPT and TYZOR® TBT (tetra isopropyl titanate and tetra n-butyl titanate, respectively) available from E. I. du Pont de Nemours and Company, Wilmington, Del., U.S.A.

The complexing agents suitable for use in the present invention are generally hydroxycarboxylic acids, aminocarboxylic acids, or combinations of two or more thereof. It is presently preferred that the complexing agents be α-hydroxycarboxylic acids, hydroxyalkyl α-aminocarboxylic acids in which the alkyl group has 1 to about 15, preferably 1 to 10 carbon atoms per group, and combinations of two or more thereof. Examples of suitable complexing agents include, but are not limited to, lactic acid, glycolic acid, citric acid, tartaric acid, malic acid, glycine, bis-hydroxyethyl glycine, hydroxyethyl glycine, and combinations of two or more thereof.

It is presently preferred that the phosphorus source be selected from a phosphonic acid, a phosphinic acid, a phosphine, or combinations of two or more thereof. The phosphorus source can have an alkyl, alkenyl, alkaryl, aryalkyl, or aryl group directly bonded to the phosphorus atom. Typically each group can contain 1 to about 25, preferably 1 to about 20, and most preferably 1 to 15 carbon atoms per group. For example, methyl group, ethyl group, a phenyl group, or naphthyl group can be present. These groups can further be substituted with substituent groups that do not unduly interfere with the preparation of the catalyst composition or subsequent reactions employing the catalyst. Furthermore, the hydroxy group of the acid can also be substituted. For example, one or two OH groups bonded to the phosphorus atom of a phosphonic acid can be esterified.

The organic phosphonic acids tend to be stronger chelating agents than the phosphinic acids, and can be used for applications where a strong bond is desired between the phosphorus compound and the organic titanium compound. For example, phenyl phosphinic acid, diphenyl phosphinic acid and 3-(hydroxyphenylphosphinyl)propanoic acid have been found to provide an excellent balance between reaction rate and preventing color generation in applications wherein the catalyst system is used as a polycondensation catalyst for the preparation of polyalkylene terephthalates in general, and PET in particular. Examples of suitable phophines include, but are not limited to, 1,2-bis-diphenylphosphinoethane, 1,3-bis-diphenylphosphinopropane, 1,4-bis-diphenylphosphinobutane, bis-4-tolylphosphine oxide, bis-3,5-xylylphosphine oxide, or combinations of two or more thereof.

A sulfonic acid or salt thereof can optionally be used in the present invention. The presently preferred sulfonic acids can be any aryl or alkyl sulfonic acid that can be substantially soluble in a solvent disclosed above. Examples of suitable sulfonic acids include, but are not limited to, p-toluene sulfonic acid, benzene sulfonic acid, methane sulfonic acid, ethane sulfonic acid, propane sulfonic acid, butane sulfonic acid, and combinations of two or more thereof. The salt of sulfonic acid can be an alkali metal salt, an alkaline earth metal salt, an ammonium salt, or combinations of two or more thereof.

Wishing not to be bound by theory, it appears that the complexing agent binds to a titanium compound during preparation of the catalyst composition thereby improving the solubility of the titanium compound and aiding in control of the optical properties on the polyester produced using these compounds.

Any solvent that can substantially dissolve the catalyst composition disclosed above can be used in the present invention. The presently preferred solvent is an alcohol having the formula of $R^1(OH)_n$, an alkylene glycol of the formula $(HO)_nA(OH)_n$, a polyalkylene glycol or alkoxylated alcohol having the formula of $R^1O[CH_2CH(R^1)O]_nH$, or combinations of two or more thereof in which each $R^1$ can be the same or different and is a hydrocarbyl radical having 1 to about 10, preferably 1 to about 8, and most preferably 1 to 5 carbon atoms per radical. The presently preferred $R^1$ is an alkyl radical, either branched or straight chain. A can have 2 to about 10, preferably 2 to about 7, and most preferably 2 to 4 carbon atoms per molecule. Each n can be the same or different and is independently a number in the range of from 1 about to about 10, preferably 1 to about 7, and most preferably 1 to 5. Examples of suitable solvents include, but are not limited to, ethanol, propanol, isopropanol, butanol, ethylene glycol, propylene glycol, isopropylene glycol, butylene glycol, 1-methyl propylene glycol, pentylene glycol, diethylene glycol, triethylene glycol, diethylene glycol monomethyl ether, triethylene glycol monomethylether, 2-ethyl hexanol, and combinations of two or more thereof. The presently preferred solvent is ethylene glycol for the polyester produced therefrom has a wide range of industrial applications.

The catalyst composition can further comprise a cocatalyst. Examples of cocatalysts include, but are not limited to, cobalt/aluminum catalysts, antimony compounds, and combinations thereof. The cobalt/aluminum catalyst comprises a cobalt salt and an aluminum compound in which the mole ratio of aluminum to cobalt is in the range of from 0.25:1 to 16:1. The cobalt/aluminum catalyst is disclosed in the U.S. Pat. No. 5,674,801, disclosure of which is incorporated herein by reference.

The presently preferred antimony compound can be any antimony compounds that are substantially soluble in a solvent disclosed above. Examples of suitable antimony compounds include, but are not limited, antimony oxides, antimony hydroxides, antimony halides, antimony sulfides, antimony carboxylates, antimony ethers, antimony glycolates, antimony alcoholates, antimony nitrates, antimony sulfates, antimony phosphates, and combinations of two or more thereof.

According to the first embodiment of the present invention, the molar ratio of complexing agent to titanium compound can be in the range of from about 0.1:1 to about 5:1, preferably about 0.5:1 to about 5:1, and most preferably 1:1 to 3:1. The molar ratio of phosphorus source to titanium compound, measured as P:Ti, can be in the range of from about 0.1:1 to about 10:1, preferably about 0.5:1 to about 5:1, and most preferably 1:1 to 3:1. The molar ratio of sulfonic acid to titanium compound ($SO_3$:Ti) is generally preferred to be about 0.0001:1 to less than or equal to 2:1, preferably less than or equal to 1:1, and most preferably less than or equal to 0.5:1. The molar ratio of cocatalyst to titanium compound such as Sb:Ti or Co:Ti can be in the range of from about 0.01:1 to about 10:1. Alternatively, the titanium compound can be present in the catalyst composition in the range of from about 0.01 to about 15, preferably about 0.1 to about 10, and most preferably 0.5 to 5 percent (%), based on total weight of the composition as 100%.

According to the present invention, the catalyst composition, especially the one that comprises a sulfonic acid, can further comprise water. The water-containing composition possesses a high degree of activity and aids in controlling the optical properties of the polyester produced using the composition. The molar ratio of water, when present, to titanium compound can be in the range of about 0.01:1 to about 6:1, preferably about 0.1:1 to about 4:1, and most preferably about 1:1 to about 2:1.

While the catalyst composition has been described in detail for its preferred application, as a polycondensation catalyst for the manufacture of polyalkylene terephthalates, the composition also has general utility as an esterification or transesterification catalyst in conventional processes requiring a highly active catalyst. For example, the catalyst composition may be employed in the reaction of phthalic anhydride and octyl alcohol to from dioctyl phthalate, a plasticizer for polyvinyl chloride, having low haze. The relative ratios of the catalyst components can be adjusted to meet the requirements of a particular application.

The catalyst composition can be produced by any means known to one skilled in the art. However, it is preferred it be produced by the process disclosed in the second embodiment of the present invention.

The catalyst composition can be produced in a solvent that is compatible with or does not interfere with an esterification or transesterification or polycondensation reaction. For example, if the catalyst composition is used as a polycondensation catalyst for producing PET, the composition is preferably produced in ethylene glycol; if the catalyst composition is used for producing PBT, the composition is preferably produced in 1,4-butanediol; and if the catalyst composition is used for producing polypropylene terephthalate (PPT), the composition is preferably produced in 1,3-propylene glycol. For the production of dioctylphthalate, 2-ethylhexyl alcohol is the preferred alcohol.

While the individual components can be combined in any order, it is preferred to first combine a complexing agent disclosed above, a phosphorus source, and optionally a sulfonic acid, with a solvent to produce a mixture. Generally the combination for producing the mixture can be stirred and can be carried out at a temperature in the range of from about 0° C. to about 100° C., preferably about 30° C. to about 50° C. Generally any amount of solvent can be used as long as the amount can substantially dissolve the composition and can be in the range of from about 5 to about 50, preferably about 10 to about 30, and most preferably 10 to 20 moles per mole of the titanium compound used in the composition.

The titanium compound can then be combined with the mixture to produce the catalyst composition of the present invention. This step is preferably carried out under an inert atmosphere, such as nitrogen, carbon dioxide, helium, or combinations of two or more thereof to avoid liberating a flammable alcohol because this step is exothermic causing the temperature to rise 10 to 30° C. This step can be carried out by stirring for a period of time sufficient to substantially dissolve the titanium compound, generally about 5 minutes to about 20 hours or more followed by cooling to ambient temperature.

The catalyst composition can then be combined with a sulfonic acid if not already present, a cocatalyst, or both to produce an optional catalyst composition. The cocatalyst can also be combined with the catalyst composition when it is used in a catalytic reaction.

Alternatively, the complexing agent can be combined with a solvent and a titanium compound to form a complex. The complex can be isolated from the solvent by any conventional means such as filtration to produce an isolated complex. The isolated complex can then be combined with another mixture which comprises the phosphorus source, a solvent, and the optional sulfonic acid and/or cocatalyst to produce the catalyst composition of the present invention.

The quantities of individual components can vary with the selected compounds and generally can be such that the molar ratio of each component to titanium in the catalyst compound produced is within the range disclosed above.

The structure of the catalyst system has not been established. Based on the observed exotherm, however, it is believed that the components have reacted or complexed in some manner to form binary or tertiary composition(s), at least to some extent, that render the catalyst composition especially useful as a polycondensation catalyst in the manufacture of polyalkylene terephthalates in general, and polyethylene terephthalate (PET) in particular.

According to the third embodiment of the present invention, a process which can be used in, for example, the production of an ester or polyester is provided. The process comprises contacting, in the presence of a catalyst composition, a carbonyl compound with an alcohol. The composition is the same as that disclosed above in the first embodiment of the present invention.

According to the third embodiment of the invention, any carbonyl compound which can react with an alcohol to produce an ester can be used. Generally, such carbonyl compounds include, but are not limited to, acids, esters, amides, acid anhydrides, acid halides, oligomers or polymers having repeat units derived from an acid, or combinations of two or more thereof. The presently preferred acid is an organic acid. The presently preferred process is the polymerization of an acid or an ester and an alcohol for the production of a polyester.

A preferred process for producing an ester or polyester comprises, consists essentially of, or consists of contacting a reaction medium with a composition disclosed above in the first embodiment of the invention. The reaction medium can comprise, consist essentially of, or consist of (1) either an organic acid or an ester thereof and an alcohol, or (2) an alcohol and an oligomer having repeat units derived from an organic acid or ester.

The carbonyl compound can have the formula of $(HO)_mR^2(COOR')_p$ in which m is a number from 0 to about 10, preferably 0 to about 5, and most preferably 0 to 3; each $R^2$ and R' can be independently (1) hydrogen, (2) hydrocarbyl radical having a carboxylic acid group at the terminus, (3) hydrocarbyl radical, or (4) combinations of two or more thereof in which each radical can be substituted or unsubstituted; each radical has 1 to about 30, preferably about 3 to about 15 carbon atoms per radical which can be alkyl, alkenyl, aryl, alkaryl, aralkyl radical, or combinations of two or more thereof; and p can be an integer from 1 to a number equaling to the number of carbon atoms of $R^2$. Any anhydrides of the organic acids can also be used. The presently preferred organic acid is an organic acid having the formula of $HO_2CA^1CO_2H$ in which $A^1$ is an alkylene group, an arylene group, alkenylene group, or combinations of two or more thereof. Each $A^1$ has about 2 to about 30, preferably about 3 to about 25, more preferably about 4 to about 20, and most preferably 4 to 15 carbon atoms per group. Examples of suitable organic acids include, but are not limited to, terephthalic acid, isophthalic acid, napthalic acid, succinic acid, adipic acid, phthalic acid, glutaric acid, acrylic acid, oxalic acid, benzoic acid, maleic acid, propenoic acid, 4-hydroxybenzoic acid, 12-hydroxydecanoic acid, 6-hydroxyhexanoic acid, 4-hydroxycinnamic acid, 4-hydroxymethylbenzoic acid, 4-hydroxyphenylacetic acid, azelaic acid, salicylic acid, caproic acid, stearic acid, palmitic acid, fumaric acid, naphthlane dicarboxylic acid, citric acid, trimesic acid, pamoic acid, sebacic acid, any anhydride of these acids, and combinations of two or more thereof. The presently preferred organic acid is terephthalic acid because the polyesters produced therefrom have a wide range of industrial applications. Examples of suitable esters include, but are not limited to, dimethyl adipate, dimethyl phthalate, dimethyl terephthalate, methyl benzoate, dimethyl glutarate, and combinations of two or more thereof.

Any alcohol that can esterify an acid to produce an ester or polyester can be used in the present invention. The presently preferred alcohol has the formula of $R^3(OH)_n$, an alkylene glycol of the formula $(HO)_nA(OH)_n$, or combinations thereof in which each $R^3$ can be the same or different and is a hydrocarbyl radical having 1 to about 20, preferably 1 to about 12, and most preferably 1 to 8 carbon atoms per radical. The presently preferred $R^3$ is an alkyl radical, either branched or straight chain. A can have 2 to about 10, preferably 2 to about 7, and most preferably 2 to 4 carbon atoms per molecule. Each n can be the same or different and is independently a number in the range of from 1 about to about 10, preferably 1 to about 7, and most preferably 1 to 5. Examples of suitable alcohols include, but are not limited to, ethanol, propanol, isopropanol, butanol, ethylene glycol, propylene glycol, isopropylene glycol, butylene glycol, 1-methyl propylene glycol, pentylene glycol, diethylene glycol, triethylene glycol, 2-ethyl hexanol, stearyl alcohol, 1,6-hexanediol, glycerol, pentaerythritol, and combinations of two or more thereof. The presently most preferred alcohol is an alkylene glycol such as ethylene glycol for the polyester produced therefrom has a wide range of industrial applications.

The contacting of the reaction medium with the catalyst can be carried out by any suitable means. For example, the individual compositions of the reaction medium can be combined before being contacted with the catalyst. However, it is presently preferred that the catalyst be first dissolved or dispersed in an alcohol by any suitable means such as mechanical mixing or stirring to produce a solution or dispersion followed by combining the solution or dispersion with (1) an organic acid, an ester, an oligomer of an organic acid, or combinations of two or more thereof and (2) an alcohol under a condition sufficient to effect the production of an ester or polyester.

The oligomer of the diacid and alkylene glycol generally has a total of about 1 to about 100, preferably from about 2 to about 10 repeat units derived from the diacid and alkylene oxide.

A suitable condition to effect the production of a polyester can include a temperature in the range of from about 150° C. to about 350° C., preferably about 200° C. to about 300° C., and most preferably 250° C. to 300° C. under a pressure in the range of from about 0.001 to about 10 atmospheres for a time period of from about 1 to about 20, preferably about 1 to about 15, and most preferably 1 to 10 hours.

The molar ratio of the alcohol (or alkylene glycol) to carbonyl compound (or organic acid or ester ) can be any ratio so long as the ratio can effect the production of a polyester. Generally the ratio can be in the range of from about 1:1 to about 10:1, preferably about 1:1 to about 5:1, and most preferably about 1:1 to about 3:1. The molar ratio of the alcohol (or alkylene glycol) to carbonyl compound (or organic acid or ester) for the oligomer having repeat units derived from the carbonyl compound (or organic acid or ester) to alcohol (or alkylene glycol) can have the same ratio of q:(q−1) in which q can be in the range of from about 2 to about 100, preferably about 2 to 10, and most preferably 2 to 5.

According to the present invention, the reaction medium, if a sulfonic acid is present in the catalyst composition, can also comprises water. The quantity of water, if present, is the same as that disclosed above.

The catalyst can be present in the range of about 0.0001 to about 30,000 parts per million by weight (ppmw) of the polymerization medium, preferably about 0.001 to about 1,000 ppmw, and most preferably 0.1 to 100 ppmw. Other ingredients also can be present to enhance catalyst stability or performance. While the advantages of the catalyst can be obtained with polyalkylene terephthalates in general, the advantages are particularly evident as a substitute for most of antimony in the manufacture of PET since color purity is an important criteria for commercial articles typically made from PET.

The catalyst composition can be used in producing esters or polyesters by using any of the conventional melt or solid state techniques. The catalyst compositions are compatible with conventional esterification and transesterification catalysts (e.g., manganese, cobalt, and/or zinc salts) and may be introduced to the production process concurrent with, or following, introduction of the esterification catalyst. The catalyst compositions also have been found to be effective in promoting the esterification reaction, and may be used as a substitute for some or all of the esterification catalyst as well as the polycondensation catalyst.

The following Examples are provided to further illustrate the present invention and are not to be construed as to unduly limit the scope of the invention. All TYZOR® products noted in the examples were obtained from DuPont, Wilmington, Del., USA.

EXAMPLES

Dimethyl terephthalate was transesterified with ethylene glycol, using a zinc acetate catalyst, in accordance with Example A to form DMT oligomer. Novel catalysts of this invention synthesized in accordance with Examples 1 through 39 were employed as polycondensation catalysts for the DMT of Example A following the procedure of Example B. The results are shown in Table 1.

Color of the resulting polymer was measured in terms of the L-value and b-value, using an instrument such as the SP-78 Spectrophotometer. The L-value shows brightness, with the greater the numerical value showing higher (desirable) brightness. Preferably, the L-value will be equal to or higher than that of the polymer made using antimony catalyst. The b-value shows the degree of yellowness, with a higher numerical value showing a higher (undesirable) degree of yellowness. Preferably, the b-value will be equal to or lower than that of the polymer made using antimony catalyst. Because the color measurement is well known to one skill in the art, the description of which is omitted herein for the interest of brevity.

Example A

Preparation of antimony-free DMT oligomer

The oligomers used in these examples contained dimethyl terephthalate, ethylene glycol, with no added antimony. It was prepared as follows:

An autoclave was charged with 100 lbs. (45.4 Kg) of dimethyl terephthalate, 67 lbs. (30.4 Kg) of ethylene glycol and 4.4 gms of zinc acetate dihydrate. The batch was heated to 240° C. at an agitation speed of 15 rpm, and 33 lbs. (15.0 Kg) of methanol and 14.3 lbs. (6.5 Kg) of ethylene glycol removed. The charge was then heated to 275° C. over the course of 90 minutes, and the remaining ethylene glycol removed at 285° C. and below 2 mm Hg vacuum. Once the condensation mass was judged to be complete, the molten mass was extruded into an aqueous bath to solidify the product. The resultant polymer was dried to remove residual moisture before use.

Example B

Testing of catalyst in oligomer

A 1-liter resin kettle was provided with an Jiffy Mixer agitator rotating at 40 rpm, a thermocouple, condenser and nitrogen sweep. To this kettle was added the catalyst to be tested, 115 ml of ethylene glycol, and 400 gm of DMT oligomer prepared as in Example 1a. The agitator was turned on and the temperature was increased to 275° C. over a period of about 2.5 hours. The contents were polymerized by holding under agitation at 275° C. and a pressure of 120 torr for 20 minutes, and at 280° C. and a pressure of 30 torr for an additional 20 minutes. The contents were then held under agitation at 285° C. at 1 to 3 mm Hg pressure for a time sufficient to reach 15 oz-in (ounce-inches) torque as measured by an Electro-Craft Motomatic torque controller. The time for this step was recorded as the Finish Time, and varied with the catalyst used. The polymer melt was then poured into a water bath to solidify the melt, and the resultant solid annealed at 150° C. for 12 hours and ground to pass through a 2 mm filter for color measurements using the previously described spectrophotometer.

Example 1

A 500 ml flask equipped with a means of agitation, a nitrogen purge, a thermocouple to control and record temperature and a dropping funnel was charged with 196.5 g (3.17 moles) of ethylene glycol, 30.1 g (0.158 moles) of p-toluenesulfonic acid monohydrate and 45 g (0.317 moles) of phenylphosphinic acid. Agitation was started and 45 g (0.158 moles) of tetraisopropyl titanate (TYZOR® TPT) was added dropwise over 30 minutes. The temperature was allowed to rise to 40° C. during the addition and then held at 40° C. for 2 hours, after which the reaction mass was cooled to give 317.8 g of a pale yellow solution containing 2.39% Ti.

Example 2

A 500 ml flask, equipped as in example 1, was charged with 174.7 (2.81 moles) of ethylene glycol, 53.5 g (0.281 moles) of p-toluenesulfonic acid monohydrate and 40 g (0.281 moles) of phenylphosphinic acid. Agitation was started and 40 g (0.141) moles of TYZOR® TPT was added dropwise over 30 minutes. The reaction mass was allowed to reach 40° C. during the addition and then held at 40° C. for 2 hours to give 308 g of a pale yellow liquid containing 2.19% Ti.

Example 3

Example 2 was repeated except 107.1 g (0.563 moles) of p-toluenesulfonic acid monohydrate was used to give 322 g of a pale yellow solution containing 2.09% Ti.

Example 4

A 500 ml flask, equipped as for example 1, was charged with 196.5 g (3.17 moles) of ethylene glycol, 21.2 g (0.158 moles) of malic acid and 60.2 g (0.317 moles) of p-toluenesulfonic acid monohydrate. Agitation was started and 45 g (0.158 moles) of TYZOR® TPT was added dropwise over 30 minutes, while maintaining temperature at 40° C. Following addition the reaction mass was held at 40° C. 2 hours to give on cooling 323 g of a pale yellow liquid containing 2.35% Ti.

Example 5

Example 4 was repeated except 30.1 g (0.158 moles) of p-toluenesulfonic acid monohydrate was used. The resultant 293 g of pale yellow solution contained 2.59% Ti.

Example 6

A 500 ml flask, equipped as for example 1, was charged with 174.7 g (2.81 moles) of ethylene glycol, 26.8 g (0.141 moles) of p-toluenesulfonic acid monohydrate and 37.7 g (0.281 moles) of malic acid. Agitation was started and 40 g (0.141 moles) of TYZOR® TPT was added dropwise over 30 minutes. The temperature was allowed to rise to 40° C. during this addition, after which the reaction mass was held at 40° C. for 2 hours to give 279 g of a pale yellow solution containing 2.41% Ti.

Example 7

A 500 ml flask, equipped as for example 1, was charged with 218 g (3.52 moles) of ethylene glycol, 67.6 g (0.352 moles) of anhydrous citric acid and 33.5 g (0.176 moles) of p-toluenesulfonic acid monohydrate. Agitation was started and 50 g (0.176 moles) of TYZOR® TPT was added dropwise over 30 minutes. The reaction mass was allowed to heat to 40° C. during the addition, after which, it was held at 40° C. for 2 hours to give 363 g of a pale yellow liquid containing 2.3% Ti.

Example 8

A 500 ml flask, equipped as for example 1, was charged with 152.8 g (2.46 moles) of ethylene glycol, 93.7 g (0.492 moles) of p-toluenesulfonic acid monohydrate and 35 g (0.246 moles) of phenylphosphinic acid. Agitation was started and 35 g (0.123 moles) of TYZOR® TPT was added dropwise over 30 minutes while allowing the temperature to reach 40° C. The reaction mass was held at 40° C. for an additional 2 hours and then cooled to give 316 g of a pale yellow liquid containing 1.86% Ti.

Example 9

Reaction 8 was repeated except 17.5 g (0.123 moles) of phenylphosphinic acid was used to give 299 g of a pale yellow liquid containing 1.97% Ti.

Example 10

A 500 ml flask, equipped as for example 1, was charged with 161.6 g (2.6 moles) of ethylene glycol, 74.3 g (0.39 moles) of p-toluenesulfonic acid monohydrate and 18.5 g (0.13 moles) of phenylphosphinic acid. Agitation was started and 37 g (0.13 moles) of TYZOR® TPT was added dropwise over 30 minutes, while allowing the temperature to reach 40° C. The reaction mass was held at 40° C. for 2 hours then cooled to give 291 g of a pale yellow liquid containing 2.14% Ti.

Example 11

A 500 ml flask, equipped as for example 1, was charged with 218.3 g (3.51 moles) of ethylene glycol, 23.6 g (.176 moles) of malic acid, 25 g (0.176 moles) of phenylphosphinic acid and 33.5 g (0.176 moles) of p-toluenesulfonic acid monohydrate. Agitation was started and 50 g (0.176 moles) of TYZOR® TPT was added dropwise over 30 minutes. The temperature was allowed to reach 40 C during this addition. The reaction mass was cooled and 175.2 g (0.085 moles Ti) was transferred to a 250 ml beaker. Agitation was started and 6.35 g (0.353 moles) of water was added slowly to the solution to give 181.6 g of a pale yellow solution containing 2.13% Ti. A white solid precipitated from this solution on standing.

Example 12

Example 11 was repeated except 47.2 g (0.352 moles) of malic acid was used. When the addition of TYZOR® TPT was complete, 12.7 g (0.706 moles) of water was added dropwise to the solution to give 387 g of a pale yellow liquid containing 2.18% Ti. A white solid precipitated from this solution on standing.

Example 13

A one liter flask, equipped as in Example 1, was charged with 318 g (5.12 moles) of ethylene glycol, 70.8 g (0.53 moles) of malic acid, 25 g (0.176 moles) of phenylphosphinic acid and 33.5 g (0.176 moles) of p-toluenesulfonic acid monohydrate. Agitation was started and 50 g (0.176 moles) of TYZOR® TPT was added dropwise over 30 minutes. The temperature was allowed to rise to 40° C. during the addition. The reaction mass was then held at 40° C. for an additional 2 hours to give 496 g of a clear, pale yellow solution containing 1.7% Ti.

Example 14

A one liter flask, equipped as in example 1, was charged 568 g (9.16 moles) of ethylene glycol, 70.8 g (0.52 moles) of malic acid, 50 g (0.35 moles) of phenylphosphinic acid and 33.5 g (0.176 moles) of p-toluenesulfonic acid monohydrate. Agitation was started and 50 g (0.176 moles) of TYZOR® TPT was added dropwise over 30 minutes. The temperature was allowed to rise to 40 C during the addition. The reaction mass was then held at 60 C an additional 2 hours to give 780 g of a pale yellow solution, containing 1.1% Ti.

Example 15

Example 13 was repeated except 418 g (6.74 moles) of ethylene glycol, 47.2 g (0.52 moles)of malic acid and 50 g (0.176 moles) of phenylphosphinic acid was used to give a 592 g of pale yellow solution containing 1.4% Ti.

Example 16

Example 13 was repeated except 67.6 g (0.352 moles) of anhydrous citric acid was used instead of 70.8 g of malic acid to give 487 g of a pale yellow solution containing 1.75% Ti.

Example 17

A one liter flask, equipped as for Example 1, was charged with 418 g (6.74 moles) of ethylene glycol, 47.2 g (0.35 moles) of malic acid, 50 g (0.35 moles) of phenylphosphinic acid and 33.5 g (0. 176 moles) of p-toluenesulfonic acid monohydrate. Agitation was started add 50 g (0.176 moles) of TYZOR® TPT was added dropwise over 30 minutes. The temperature was allowed to reach 40° C. during the addition. The reaction mass was then held at 60° C. for 2 hours to give 586 g of a pale yellow solution containing 1.4% Ti.

Example 18

A 1-liter flask, equipped as for example 1, was charged with 368 g (5.93 moles) of ethylene glycol, 33.8 g (0.176 moles) of anhydrous citric acid, 50 g (0.352 moles) of phenylphosphinic acid, 23.6 g (0.176 moles) of malic acid and 33.5 g (0.176 moles) of p-toluenesulfonic acid monhydrate. Agitation was started and 50 g (0.176) moles of TYZOR® TPT was added dropwise over 30 minutes. The reaction mass temperature was allowed to reach 40 C during the addition. The reaction mass was held at 60° C. 2 hours, and then cooled to RT and bottled out to give 550.8 g of a pale yellow liquid containing 1.5% Ti.

Example 19

Example 18 was repeated, however 67.6 g (0.352 moles) of anhydrous citric acid was used to give 560 g of a pale yellow liquid containing 1.5% Ti.

Example 20

A 1 liter flask, equipped as for example 1, was charged with 268 g (4.32 moles) of ethylene glycol, 23.6 g (0.176 moles) of malic acid, 50 g (0.352 moles) of phenylphosphinic acid and 33.5 g (0.176 moles) of p-toluenesulfonic acid monohydrate. Agitation was started and 50 g (0.176 moles) of TYZOR® TPT was added dropwise over 30 minutes. The reaction mass was allowed to heat to 40° C. during the addition and then heated to 60° C. and held at 60 C for 2 hours to give 419.2 g of a pale yellow liquid containing 2.0% Ti.

Example 21

Example 20 was repeated, except 33.8 g (0.176 moles) of anhydrous citric acid was used instead of 23.6 g of malic acid to give 427.8 g of a pale yellow liquid containing 1.9% Ti.

Example 22

A 1 liter flask, equipped as for example 1, was charged with 318 g (5.12 moles) of ethylene glycol, 23.6 g (0.176 moles) of malic acid, 50 g (0.352 moles) of phenylphosphinic acid and 67 g (0.352 moles) of p-toluenesulfonic acid monohydrate. Agitation was started and 50 g (0.176 moles) of TYZOR® TPT was added dropwise over 30 minutes, while allowing the temperature to reach 40° C. The reaction mass was then heated to 60° C. and held for 2 hours to give 502 g of a pale yellow solution containing 1.7% Ti.

Example 23

A one liter flask, equipped as for example 1, was charged with 519 g (8.37 moles) of ethylene glycol, 33.8 g (0.176 moles) of anhydrous citric acid, 50 g (0.352 moles) of phenylphosphinic acid and 67 g (0.352 moles) of p-toluenesulfonic acid monohydrate. Agitation was started and 50 g (0.176 moles) of TYZOR® TPT was added dropwise over 30 minutes. The reaction mass was allowed to heat to 40° C. during the addition, after which, it was held at 60° C. for 2 hours to give 514 g of a pale yellow liquid containing 1.6% Ti.

Example 24

A 500 ml flask, equipped as for example 1, was charged with 161.6 g (2.6 moles) of ethylene glycol, 49.5 g (0.26 moles) of p-toluenesulfonic acid monohydrate and 18.5 g (0.13 moles) of phenylphosphinic acid. Agitation was started and 37 g (0.13 moles) of TYZOR® TPT was added dropwise over 30 minutes. The reaction mass temperature was allowed to reach 40° C. during the addition. The reaction mass was cooled immediately following the addition to give 267 g of a pale yellow solution containing 2.34% Ti.

Example 25

Example 11 was repeated, except 47.2 g (0.352 moles) of malic acid was used to give 374 g of a pale yellow solution containing 2.25% Ti.

Example 26

A 500 ml flask, equipped as for example 1, was charged with 131 g (2.1 moles) of ethylene glycol, 5 g (0.026 moles) of p-toluenesulfonic acid monohydrate and 14.1 g (0.106 moles) of malic acid. Agitation was started and 44 g (0.21 moles) of tetra-ethyl orthosilicate was added dropwise at room temperature, followed by 30 g (0.106 moles) of TYZOR® TPT. The reaction mass was agitated for 1 hours at room temperature to give 224 g of a pale yellow liquid containing 2.26% Ti.

Example 27

Example 25 was repeated, however 12.7 g of water was added at the end of the reaction to give 386 g of a pale yellow solution containing 2.18% Ti.

Example 28

Example 27 was repeated, however 23.6 g (0.176 moles) of malic acid was used to give 363 g of a pale yellow solution containing 2.18% Ti.

Example 29

Example 25 was repeated, however 23.6 g (0.176 moles) of malic acid was used to give 350 g of a pale yellow solution containing 2.4% Ti.

Example 30

Example 11 was repeated except 33.8 g (0.176 moles) of anhydrous citric acid was used in place of the 23.6 g of malic acid to give 354.7 g of a pale yellow liquid containing 2.3% Ti.

Example 31

A 500 ml flask, equipped as for example 1, was charged with 262 g (0.4.23 moles) of ethylene glycol, 28.3 g (0.211 moles) of malic acid, 30 g (0.211 moles) of phenylphosphinic acid and 10 g (0.053 moles) of p-toluenesulfonic acid monhydrate. Agitation was started and 60 g (0.211 mmoles) of TYZOR® TPT was added dropwise over 30 minutes while allowing the temperature to reach 40° C. At the end of the reaction 15.2 g of water was added slowly to give 405 g of a pale yellow solution containing 2.5% Ti.

Example 32

Example 31 was repeated, however there was no the water addition at the end of the reaction to give 390 g of a pale yellow solution containing 2.59% Ti.

Example 33

A one liter flask, equipped as for example 1, was charged with 410 g (6.6 moles) of ethylene glycol, 33.5 g (0.25 moles) of malic acid, 12 g (0.0625 moles) of p-toluenesulfonic acid monohydrate and 33.5 g (0.24 moles) of phenylphosphinic acid. Agitation was started and 71 g (0.25 moles) of TYZOR® TPT was added dropwise over 30 minutes. The reaction mass was allowed to heat to 40° C. during the addition. The charge was then held at 50° C. for 2 hours to give 560 g of a pale yellow solution containing 2.1% Ti.

Example 34

A 500 ml flask, equipped as for Example 1, was charged with 318 g (5.13 moles) of ethylene glycol, 23.6 g (0.176 moles) of malic acid, 16.9 g (0.088 moles) of anhydrous citric acid, 25 g (0.176 moles) of phenylphosphinic acid and 8.5 g (0.044 moles) of p-toluenesulfonic acid monohydrate. Agitation was started and 50 g (0. 176 moles) of TYZOR® TPT was added dropwise over 30 minutes, allowing the temperature to reach 40 C. The reaction mass was held at 60° C. for 2 hours to give 435 g of a pale yellow solution containing 1.9% Ti.

Example 35

Example 34 was repeated, except 368 g (5.94 moles) of ethylene glycol and 11.8 g (0.088 moles) of malic acid were used to give 472 g of a pale yellow solution containing 1. 8% Ti.

Example 36

Example 33 was repeated, except 310 g (5 moles) of ethylene glycol and 48 g (0.25 moles) of anhydrous citric acid were used instead of 410 g of ethylene glycol and 33.5 g malic acid to give 474 g of a pale yellow solution containing 2.5% Ti.

Example 37

A 500 ml flask, equipped as for example 1, was charged with 368 g (5.94 moles) of ethylene glycol, 23.6 g (0.176 moles) of malic acid, 50 g (0.352 moles) of phenylphosphinic acid and 8.5 g (0.044 moles) of p-toluenesulfonic acid monohydrate. Agitation was started and 50 g (0.176 moles) of TYZOR® TPT was added dropwise over 30 minutes while maintaining the reaction temperature at 40° C. The charge was heated at 60° C. for 2 hours to give 487 g of a pale yellow solution containing 1.63% Ti.

Example 38

A 500 ml flask, equipped as for example 1, was charged with 368 g (5.94 moles) of ethylene glycol, 11.8 g (0.088 moles) of malic acid, 16.9 g (0.088 moles) of anhydrous citric acid and 8.5 g (0.044 moles) of p-toluenesulfonic acid monohydrate. Agitation was started and 50 g (0.176 moles) of TYZOR® TPT was added dropwise over 30 minutes, while allowing the temperature to rise to 40 C. The charge was held at 60° C. for 2 hours to give 493 g of a pale yellow solution containing 1.67% Ti.

Example 39

A 500 ml flask, equipped as for example 1, was charged with 318 g (5.13 moles) of ethylene glycol, 33.8 g (0.176 moles) of anhydrous citric acid, 50 g (0.352 moles) of phenylphosphinic acid and 8.5 g (0.044 moles) of p-toluenesulfonic acid monohydrate. Agitation was started and 50 g (0.176 moles) of TYZOR® TPT was added dropwise over 30 minutes while allowing the temperature of the charge top reach 40° C. The charge was held at 60° C. for 2 hours and cooled to give 454 g of a pale yellow solution containing 1.8% Ti. Results shown in Table 1 indicate that the invention catalyst composition produced high quality polymers.

TABLE 1[A]

| Exp | CA | MA | P | S | L-color | a-color | b-color |
|---|---|---|---|---|---|---|---|
| 1 | — | — | 2 | 1 | 69.28 | −0.74 | 10.94 |
| 2 | — | — | 2 | 2 | 74.78 | −1.26 | 7.37 |
| 3 | — | — | — | 4 | 70.88 | +0.33 | 6.87 |
| 4 | — | 1 | — | 2 | 74.35 | −1.04 | 9.96 |
| 5 | — | 1 | — | 1 | 69.05 | −0.05 | 11.66 |
| 6 | — | 2 | — | 1 | 74.52 | −0.27 | 11.90 |
| 7 | 2 | — | — | 1 | 74.81 | +0.19 | 9.25 |
| 8 | — | — | 2 | 4 | 70.68 | +1.64 | 9.42 |
| 9 | — | — | 1 | 4 | 72.34 | +0.25 | 6.97 |
| 10 | — | — | 1 | 3 | 72.25 | −1.40 | 9.33 |
| 11 | — | 1 | 1 | 1 | — | | — |
| 12 | — | 2 | 1 | 1 | — | | — |
| 13 | — | 3 | 1 | 0 | 76.90 | −0.34 | 11.22 |
| 14 | — | 3 | 2 | 1 | 72.72 | −1.01 | 8.40 |
| 15 | — | 3 | 2 | 1 | 70.53 | −0.84 | 10.51 |
| 16 | — | 3 | 2 | 1 | 75.35 | −1.30 | 10.27 |
| 17 | — | 2 | 2 | 1 | 76.27 | +0.17 | 10.20 |
| 18 | 1 | 1 | 2 | 1 | 72.66 | −0.86 | 10.98 |
| 19 | 2 | — | 2 | 1 | 75.37 | −0.61 | 11.34 |
| 20 | — | 1 | 2 | 1 | 73.72 | −1.16 | 8.14 |
| 21 | 1 | — | 2 | 1 | 76.92 | −0.83 | 7.81 |
| 22 | — | 1 | 2 | 2 | 75.58 | −0.63 | 8.43 |
| 23 | 1 | — | 2 | 2 | 70.28 | −0.87 | 8.34 |
| 24 | — | — | 1 | 2 | 78.03 | −1.05 | 8.36 |
| 25 | — | 2 | 1 | 1 | 76.46 | −0.24 | 7.92 |
| 26 | 2 | — | 1 | 1 | 76.81 | −0.71 | 9.97 |
| 27 | — | 2 | 1 | 1 | 76.60 | −1.26 | 8.59 |
| 28 | — | 1 | 1 | 1 | 76.95 | −1.14 | 7.69 |
| 29 | — | 1 | 1 | 1 | 76.52 | −0.81 | 7.50 |
| 30 | 1 | — | 1 | 1 | 75.67 | −1.29 | 9.60 |
| 31 | — | 1 | 1 | 0.25 | 76.10 | −0.96 | 8.29 |
| 32 | — | 1 | 1 | 0.25 | 78.81 | −0.82 | 8.70 |
| 33 | — | 1 | 1 | 0.25 | 77.37 | −1.42 | 9.22 |
| 34 | 0.5 | 1 | 1 | 0.25 | 76.23 | −1.30 | 12.25 |
| 35 | 0.5 | 0.5 | 1 | 0.25 | 77.15 | −0.73 | 9.12 |
| 36 | 1 | — | 1 | 0.25 | 70.53 | −1.30 | 9.58 |
| 37 | — | 1 | 2 | 0.25 | 69.92 | −0.12 | 11.81 |
| 38 | 0.5 | 0.5 | 2 | 0.25 | 76.81 | −1.49 | 8.15 |
| 39 | 1 | — | 2 | 0.25 | 76.09 | −1.01 | 8.78 |

[A]Exp, example number; CA, citric acid, the values shown are molar ratio of CA to TPT; MA, malic acid, the values shown are molar ratio of MA to TPT; P, phenylphosphinic acid, the values shown are molar ratio of P to TPT; and S, p-toluenesulfonic acid, the values shown are molar ratio of S to TPT.

What is claimed is:

1. A composition comprising an organic titanium compound, a complexing agent, a phosphorus source, and a solvent wherein said complexing agent is selected from the group consisting of hydroxycarboxylic acids, aminocarboxylic acids, and combinations thereof; and said phosphorus source is selected from the group consisting of a phosphonic acid, a phosphinic acid, a phosphine, and combinations of two or more thereof.

2. A composition according to claim 1 further comprising a sulfonic acid.

3. A composition according to claim 1 further comprising a cocatalyst selected from the group consisting of a cobalt/aluminum catalyst, an antimony compound, and combinations thereof.

4. A composition according to claim 1 wherein said solvent is an alcohol.

5. A composition according to claim 1 wherein said solvent is selected from the group consisting of ethanol, propanol, isopropanol, butanol, ethylene glycol, propylene glycol, isopropylene glycol, butylene glycol, 1-methyl propylene glycol, pentylene glycol, diethylene glycol, triethylene glycol, diethylene glycol monomethyl ether, triethylene glycol monomethylether, 2-ethyl hexanol, and combinations of two or more thereof.

6. A composition according to claim 1 wherein alcohol is ethylene glycol.

7. A composition according to claim 1 wherein said titanium compound has the formula $Ti(OR)_4$ wherein each R is independently selected from the group consisting of an alkyl radical, a cycloalkyl radical, aralkyl radical, and combinations of two or more thereof and contains from 1 to about 30 carbon atoms per radical.

8. A composition according to claim 1 wherein said titanium compound is selected from the group consisting of tetra isopropyl titanate, tetra n-butyl titanate, and combinations thereof.

9. A composition according to claim 6 wherein said titanium compound is selected from the group consisting of tetra isopropyl titanate, tetra n-butyl titanate, and combinations thereof.

10. A composition according to claim 1 wherein said complexing agent is selected from the group consisting of lactic acid, glycolic acid, citric acid, isocitric acid, tartaric acid, malic acid, malonic acid, glycine, hydroxyethyl glycine, bis-hydroxyethyl glycine, and combinations of two or more thereof.

11. A composition according to claim 2 wherein said sulfonic acid is selected from the group consisting of p-toluene sulfonic acid, benzene sulfonic acid, methane sulfonic acid, ethane sulfonic acid, propane sulfonic aicd, butane sulfonic acid, and combinations of two or more thereof.

12. A composition according to claim 9 wherein said phosphorus source is selected from the group consisting of phenyl phosphinic acid, diphenyl phosphinic acid, 3-(hydroxyphenylphosphinyl)propanoic acid, 1,2-bis-diphenylphosphinoethane, 1,3-bis-diphenylphosphinopropane, 1,4-bis-diphenylphosphinobutane, bis-4-tolylphosphine oxide, bis-3,5-xylylphosphine oxide, and combinations of two or more thereof.

13. A composition according to claim 12 wherein said complexing agent is selected from the group consisting of lactic acid, glycolic acid, citric acid, isocitric acid, tartaric acid, malic acid, malonic acid, glycine, hydroxyethyl glycine, bis-hydroxyethyl glycine, and combinations of two or more thereof.

14. A composition according to claim 12 wherein said complexing agent is selected from the group consisting of malic acid, citric acid, and combinations thereof.

15. A composition according to claim 1 wherein said composition is produced by combining said titanium compound, said phosphorus source, said complexing agent, and said solvent.

16. A composition according to claim 14 wherein said composition is produced by combining said titanium compound, said complexing agent, phosphorus source, and said solvent.

17. A composition prepared by combining a titanium compound, a complexing agent, a phosphorus source, and a solvent wherein said complexing agent is selected from the group consisting of hydroxycarboxylic acids, aminocarboxylic acids, and combinations thereof; and said phosphorus source is selected from the group consisting of a phosphonic acid, a phosphinic acid, a phosphine, and combinations of two or more thereof.

18. A composition according to claim 17 wherein said composition is produced by further combining said composition with a cocatalyst selected from the group consisting of a cobalt/aluminum catalyst, an antimony compound, and combinations thereof.

19. A composition according to claim 17 wherein said solvent is an alcohol.

20. A composition according to claim 17 wherein said solvent is selected from the group consisting of ethanol, propanol, isopropanol, butanol, ethylene glycol, propylene glycol, isopropylene glycol, butylene glycol, 1-methyl propylene glycol, pentylene glycol, diethylene glycol, triethylene glycol, diethylene glycol monomethyl ether, triethylene glycol monomethylether, 2-ethyl hexanol, and combinations of two or more thereof.

21. A composition according to claim 17 wherein said composition is produced by further combining said composition with a sulfonic acid selected from the group consisting of p-toluene sulfonic acid, benzene sulfonic acid, methane sulfonic acid, ethane sulfonic acid, propane sulfonic acid, butane sulfonic acid, and combinations of two or more thereof.

22. A composition according to claim 21 wherein said composition is produced by further combining said composition with a cocatalyst selected from the group consisting of a cobalt/aluminum catalyst, an antimony compound, and combinations thereof.

23. A composition according to claim 17 wherein alcohol is ethylene glycol.

24. A composition according to claim 17 wherein said titanium compound has the formula $Ti(OR)_4$ wherein each R is independently selected from the group consisting of an alkyl radical, a cycloalkyl radical, aralkyl radical, and combinations of two or more thereof and contains from 1 to about 30 carbon atoms per radical.

25. A composition according to claim 23 wherein said titanium compound is selected from the group consisting of tetra isopropyl titanate, tetra n-butyl titanate, and combinations thereof.

26. A composition according to claim 19 wherein said titanium compound is selected from the group consisting of tetra isopropyl titanate, tetra n-butyl titanate, and combinations thereof.

27. A composition according to claim 17 wherein said complexing agent is selected from the group consisting of lactic acid, glycolic acid, citric acid, isocitric acid, tartaric acid, malic acid, malonic acid, glycine, hydroxyethyl glycine, bis-hydroxyethyl glycine, and combinations of two or more thereof.

28. A composition according to claim 27 wherein said phosphorus source is selected from the group consisting of phenyl phosphinic acid, diphenyl phosphinic acid, 3-(hydroxyphenylphosphinyl)propanoic acid, 1,2-bis-diphenylphosphinoethane, 1,3-bis-diphenylphosphinopropane, 1,4-bis-diphenylphosphinobutane, bis-4-tolylphosphine oxide, bis-3,5-xylylphosphine oxide, and combinations of two or more thereof.

29. A composition according to claim 28 further comprising combining said composition with a cocatalyst selected from the group consisting of a cobalt/aluminum catalyst, an antimony compound, and combinations thereof.

30. A process comprising combining a titanium compound, a complexing agent, a phosphorus source, and a solvent wherein said complexing agent is selected from the group consisting of hydroxycarboxylic acids, aminocarboxylic acids, and combinations thereof; and said phosphorus source is selected from the group consisting of a phosphonic acid, a phosphinic acid, a phosphine, and combinations of two or more thereof.

31. A process according to claim 30 further comprising combining said titanium compound, said complexing agent, said phosphorus compound, and said solvent with a cocatalyst selected from the group consisting of a cobalt/aluminum catalyst, an antimony compound, and combinations thereof.

32. A process according to claim 30 wherein said solvent is an alcohol.

33. A process according to claim 30 wherein said solvent is selected from the group consisting of ethanol, propanol, isopropanol, butanol, ethylene glycol, propylene glycol, isopropylene glycol, butylene glycol, 1-methyl propylene glycol, pentylene glycol, diethylene glycol, triethylene glycol, diethylene glycol monomethyl ether, triethylene glycol monomethylether, 2-ethyl hexanol, and combinations of two or more thereof.

34. A process according to claim 30 wherein said solvent is ethylene glycol.

35. A process according to claim 30 wherein said titanium compound has the formula $Ti(OR)_4$ wherein each R is independently selected from the group consisting of an alkyl radical, a cycloalkyl radical, aralkyl radical, and combinations of two or more thereof and contains from 1 to about 30 carbon atoms per radical.

36. A process according to claim 34 wherein said titanium compound is selected from the group consisting of tetra isopropyl titanate, tetra n-butyl titanate, and combinations thereof.

37. A process according to claim 30 wherein said complexing agent is selected from the group consisting of lactic acid, glycolic acid, citric acid, isocitric acid, tartaric acid, malic acid, malonic acid, glycine, hydroxyethyl glycine, bis-hydroxyethyl glycine, and combinations of two or more thereof.

38. A process according to claim 37 further combining said composition with a sulfonic acid is selected from the group consisting of p-toluene sulfonic acid, benzene sulfonic acid, methane sulfonic acid, ethane sulfonic acid, propane sulfonic acid, butane sulfonic acid, and combinations of two or more thereof.

39. A process according to claim 38 further comprising combining said composition with a cocatalyst selected from the group consisting of a cobalt/aluminum catalyst, an antimony compound, and combinations thereof.

40. A process comprising contacting, in the presence of a catalyst, a carbonyl compound and an alcohol wherein said catalyst comprises a titanium compound, a complexing agent, a phosphorus source, and a solvent wherein said said complexing agent is selected from the group consisting of hydroxycarboxylic acids, aminocarboxylic acids, and combinations thereof; and said phosphorus source is selected from the group consisting of a phosphonic acid, a phosphinic acid, a phosphine, and combinations of two or more thereof.

41. A process according to claim 40 wherein said catalyst further comprises a cocatalyst selected from the group consisting of a cobalt/aluminum catalyst, an antimony compound, and combinations thereof.

42. A process according to claim 40 wherein said solvent is an alcohol.

43. A process according to claim 40 wherein said solvent is selected from the group consisting of ethanol, propanol, isopropanol, butanol, ethylene glycol, propylene glycol, isopropylene glycol, butylene glycol, 1-methyl propylene glycol, pentylene glycol, diethylene glycol, triethylene glycol, diethylene glycol monomethyl ether, triethylene glycol monomethylether, 2-ethyl hexanol, and combinations of two or more thereof.

44. A process according to claim 40 wherein said solvent is ethylene glycol.

45. A process according to claim 40 wherein said titanium compound has the formula $Ti(OR)_4$ wherein each R is independently selected from the group consisting of an alkyl radical, a cycloalkyl radical, aralkyl radical, and combinations of two or more thereof and contains from 1 to about 30 carbon atoms per radical.

46. A process according to claim 44 wherein said titanium compound is selected from the group consisting of tetra isopropyl titanate, tetra n-butyl titanate, and combinations thereof.

47. A process according to claim 46 wherein said complexing agent is selected from the group consisting of lactic acid, glycolic acid, citric acid, isocitric acid, tartaric acid, malic acid, malonic acid, glycine, hydroxyethyl glycine, bis-hydroxyethyl glycine, and combinations of two or more thereof.

48. A process according to claim 40 wherein said carbonyl compound has a formula selected from the group consisting of $(HO)_mR^2(COOR')_p$, $HO_2CA^1CO_2H$, acid anhydride, ester, and combinations of two or more thereof; said alcohol has a formula selected from the group consisting of $R^3(OH)_n$, $(HO)_nA(OH)_n$, and combinations thereof wherein m is a number from 0 to about 10; $R^2$ and R' are each independently selected from the group consisting of (1) hydrogen, (2) hydrocarbyl radical having a carboxylic acid group at the terminus, (3) hydrocarbyl radical, and combinations of two or more thereof; each radical has 1 to about 30 carbon atoms per radical; p is an integer from 1 to a number equaling to the number of carbon atoms of $R^2$; $A^1$ an alkylene or arylene group having about 2 to about 30 carbon atoms per group; each $R^3$ is a hydrocarbyl radical having 1 to about 10 carbon atoms per radical; and is independently a number in the range of from 1 about to about 10.

49. A process according to claim 48 wherein said alcohol is selected from the group consisting of ethanol, propanol, isopropanol, butanol, ethylene glycol, propylene glycol, isopropylene glycol, butylene glycol, 1-methyl propylene glycol, pentylene glycol, diethylene glycol, triethylene glycol, 2-ethyl hexanol, stearyl alcohol, 1,6-hexanediol, glycerol, pentaerythritol, and combinations of two or more thereof.

50. A process according to claim 48 wherein said alcohol is ethylene glycol.

51. A process according to claim 50 wherein said carbonyl compound is selected from the group consisting of terephthalic acid, isophthalic acid, napthalic acid, succinic acid, adipic acid, phthalic acid, glutaric acid, acrylic acid, oxalic acid, benzoic acid, maleic acid, propenoic acid, 4-hydroxybenzoic acid, 12-hydroxydecanoic acid, 6-hydroxyhexanoic acid, 4-hydroxycinnamic acid, 4-hydroxymethylbenzoic acid, 4-hydroxyphenylacetic acid, azelaic acid, salicylic acid, caproic acid, stearic acid, palmitic acid, fumaric acid, naphthlane dicarboxylic acid, citric acid, trimesic acid, pamoic acid, sebacic acid, any anhydride of these acids, any ester of these acids, and combinations of two or more thereof.

52. A process according to claim 51 wherein said carbonyl compound is terephthalic acid.

53. A process according to claim 51 wherein said carbonyl compound is dimethyl terephthalate.

54. A process according to claim 40 wherein said alcohol is selected from the group consisting of ethanol, propanol, isopropanol, butanol, ethylene glycol, propylene glycol, isopropylene glycol, butylene glycol, 1-methyl propylene glycol, pentylene glycol, diethylene glycol, triethylene glycol, 2-ethyl hexanol, stearyl alcohol, 1,6-hexanediol, glycerol, pentaerythritol, and combinations of two or more thereof;

said carbonyl compound is a terephthalic acid or derivative of terephthalic acid; said titanium compound has the formula $Ti(OR)_4$ wherein each R is independently selected from the group consisting of an alkyl radical, a cycloalkyl radical, aralkyl radical, and combinations of two or more thereof and contains from 1 to about 30 carbon atoms per radical;

said phosphorus source is selected from the group consisting of phenyl phosphinic acid, diphenyl phosphinic acid, 3-(hydroxyphenylphosphinyl)propanoic acid, 1,2-bis-diphenylphosphinoethane, 1,3-bis-diphenylphosphinopropane, 1,4-bis-diphenylphosphinobutane, bis-4-tolylphosphine oxide, bis-3,5-xylylphosphine oxide, and combinations of two or more thereof;

said solvent is selected from the group consisting of ethanol, propanol, isopropanol, butanol, ethylene glycol, propylene glycol, isopropylene glycol, butylene glycol, 1-methyl propylene glycol, pentylene glycol, diethylene glycol, triethylene glycol, diethylene glycol monomethyl ether, triethylene glycol monomethylether, 2-ethyl hexanol, and combinations of two or more thereof; and said complexing agent is selected from the group consisting of lactic acid, glycolic acid, citric acid, isocitric acid, tartaric acid, malic acid, malonic acid, glycine, hydroxyethyl glycine, bis-hydroxyethyl glycine, and combinations of two or more thereof.

55. A composition according to claim 54 wherein said alcohol is ethylene glycol; and said carbonyl compound is selected from the group consisting of terephthalic acid, dimethyl terephthalate, and combinations thereof; said titanium compound is selected from the group consisting of tetra isopropyl titanate, tetra n-butyl titanate, and combinations thereof; said solvent is ethylene glycol; said complexing agent is selected from the group consisting of malic acid, citric acid, and combinations thereof.

56. A process according to claim 55 wherein said catalyst further comprises a sulfonic acid selected from the group consisting of p-toluene sulfonic acid, benzene sulfonic acid, methane sulfonic acid, ethane sulfonic acid, propane sulfonic acid, butane sulfonic acid, and combinations of two or more thereof.

57. A process according to claim 56 wherein said catalyst further comprises water; and the molar ratio of water to titanium compound is in the range of from about 0.01:1 to about 6:1.

* * * * *